United States Patent
Bashirullah et al.

(10) Patent No.: US 7,110,420 B2
(45) Date of Patent: Sep. 19, 2006

(54) INTEGRATED CIRCUIT DEVICES HAVING ON-CHIP ADAPTIVE BANDWIDTH BUSES AND RELATED METHODS

(75) Inventors: Rizwan Bashirullah, Raleigh, NC (US); Wentai Liu, Santa Cruz, CA (US); Ralph K. Cavin, III, Cary, NC (US)

(73) Assignee: North Carolina State University, Raleigh, NC (US)

( * ) Notice: Subject to any disclaimer, the term of this patent is extended or adjusted under 35 U.S.C. 154(b) by 418 days.

(21) Appl. No.: 10/448,785

(22) Filed: May 30, 2003

(65) Prior Publication Data

US 2005/0005046 A1 Jan. 6, 2005

(51) Int. Cl.
*H04J 3/16* (2006.01)
*H01L 23/48* (2006.01)

(52) U.S. Cl. ...................................... 370/465; 370/410
(58) Field of Classification Search ................. 257/758; 370/465, 410
See application file for complete search history.

(56) References Cited

U.S. PATENT DOCUMENTS 6,738,388 B1 * 5/2004 Stevenson et al. .......... 370/465

OTHER PUBLICATIONS

Achar, R. et al., *Simulation of High-Speed Interconnects*, Proceedings of the IEEE, vol. 89, No. 5, (May 2001).
Bailey, D. et al., *Clocking Design and Analysis for a 600-MHz Alpha Microprocessor*, IEEE Journal of Solid-State Circuits, vol. 33, No. 11, pp. 1627-1633, (Nov. 1998).
Bank, M., et al., *Practical realization of a raised-cosine filter*, Elect. Letter, vol. 32, No. 5, pp. 438-440, (Feb. 1996).
Bashirullah, R. et al., *Cross-talk reduction for interconnect-limited bus based on raised cosine signaling*, Int. Interconnect Technology Conf., San Francisco, CA., USA, pp. 66-68, (2001).
Bashirullah, R. et al, *Delay and power model for current-mode signaling in deep submicron global interconnects*, CICC, pp. 513-516, (2002).
Bathey, K. et al., *Noise Computation in Single Chip Packages*, IEEE Transactions on Components Packaging and manufacturing Technology, Part B, Bol. 19, No. 2, pp. 350-360, (May 1996).
Burger, D. et al., *The SimpleScalar tool set, Version 2.0*, University of Wisconsin, Madison, Technical Report CS-TR-97-1342, (Jun. 1997).
Delorme, N. et al., *Inductance and capacitance analytic formulas for VLSI interconnects*, Electronic Letters, vol. 32, No. 11, pp. 996-997, (1996).
Elmore, W.C., *The transient response of damped linear networks with particular regard to wide-band amplifiers*, Journal of Applied Physics, vol. 19, No. 1, pp. 55-63, (Jan. 1948).
Farjad-Rad, R. et al., *A 0.4-um CMOS 10-Gb/s 4-PAM Pre-Emphasis Serial Transmitter*, IEEE Journal of Solid State Circuits, vol. 34, No. 5, pp. 580-585, May 1999).
Gabara, T., *A Closed-Form Solution to the damped RLC Circuit With Applications to CMOS Ground Bounce Estimation*, IEEE Asic Conf., (1996).

(Continued)

*Primary Examiner*—Douglas W. Owens
(74) *Attorney, Agent, or Firm*—Myers Bigel Sibley & Sajovec

(57) ABSTRACT

An adaptive bandwidth bus is provided that switches between a current mode of operation and a voltage mode of operation. Furthermore, related methods include transmitting a data signal in a current mode or a voltage mode and transmitting a control signal to indicate whether the signal should be transmitted in the current mode or the voltage mode.

48 Claims, 10 Drawing Sheets

OTHER PUBLICATIONS

Gabara, T.J. et al., *Forming damped LRC parasitic circuits in simultaneous switched CMOS output buffers*, IEEE Journal of Solid State Circuits, 32, (3), pp. 407-418, (1997).

Gowan, M.K. et al., *Power considerations in the design of the Alpha 21264 microprocessor*, Proc. Design automation Conference, pp. 726-731, (1998).

Hara, S. et al, *Broad-Band Monolithic Microwave Active Inductor and its Application to Miniaturized Wide-Band Amplifiers*, IEEE Transaction on Microwave Theory and Techniques, vol. 36, No. 12, pp. 1920-1924, (Dec. 1988).

van Heijningen, M. et al., *Analysis and experimental verification of digital substrate noise generation for epi-type substrate*, IEEE Journal of Solid State Circuits, 35, (7), pp. 1002-1008 (2000).

Ho, C.W. et al., *The modified nodal approach to network analysis*, IEEE Trans: Circuits and Systems, vol. CAS-22, pp. 504-509, (Jun. 1975).

Ingels, M. et al., *Design strategies and Decoupling Techniques for Reducing the effects of Electrical Interference in Mixed-Mode IC's*, IEEE Journal of Solid Stat Circuits, vol. 32, No. 7, pp. 1136-1141, (Jul. 1997).

International Technology roadmap for Semiconductors, 2001 Edition.

Kamon, M. et al, *FASTHENRY: A Multipole-Accelerated 3-D Inductance Extraction Program*, IEEE Transactions on Microwave Theory and Techniques, vol. 42, No. 9, pp. 1750-1758, (Sep. 1994).

Kleveland, B. et al., *Line Inductance Extraction and Modeling in a Real Chip With Power Grid*, Electron Devices Meeting, IEDM Technical Digest International, pp. 901-904, (1999).

Krishnamurthy, R. et al., *High-performance and Low Power Challenges for Sub-70nm Microprocessor Circuits*, IEEE Custom Integrated Circuits Conference, pp. 125-128, (2002).

Larsson, P., *di/dt noise in CMOS integrated circuits*, Analog Integrated Circuits Signal Process, 14, (1), pp. 113-129, (1997).

Leung, K., *Controlled Slew-rate output buffer*, IEEE Custom Integrated Circuits Conference, pp. 5.5.1-5.5.4, (1988).

McInerney, R. et al., *Methodology For Repeater Insertion Management In RTL, Layout, Floorplan And Fullchip Timing Databases Of The Itanium™ Microprocessor*, Proc. of Int. Symp. on Physical Design,pp. 99-104, (2000).

Mizuno, M. et al., *On-chip Multi-GHZ Clocking with Transmission Lines*, IEEE ISSCC, pp. 366-367, (2000).

Mohan, S. et al., *Bandwidth Extension in CMOS with Optimized On-Chip Inductors*, IEEE Journal of Solid-State Circuits, vol. 35, No. 3, pp. 346-355, (Mar. 2000).

Ohhata, K. et al., *Design of a 32.7-GHz Bandwidth AGC Amplifier IC with Wide Dynamic Range Implemented in SiGe HBT*, IEEE Journal of Solid-State Circuits, vol. 34, No. 9, pp. 1290-1297, (Sep. 1999).

Olmstead, J.A. et al., *Noise Problems in mixed analog-digital integrated circuits*, IEEE Custom Integrated Circuits Conference, pp. 659-662, (1987).

Pillage, L.T. et al., *Asymptotic Waveform Evaluation for Timing Analysis*, IEEE Trans. on CAD, vol. 9, No. 4, pp. 352-366 (Apr. 1990).

Qi, Xiaoning et al, *On-chip Inductance Modeling of VLSI Interconnects*, IEEE International Solid-State Circuits Conference, (2000).

Rahmat, K. et al., *A Scaling Scheme for Interconnect in Deep-Submicron Processes*, IEDM, pp. 245-248, (1995).

Rocha-Perez, J.M., *SC Implementation of FIR Filters for Digital Communication Systems*, Design of Mixed-Mode Integrated circuits and Applications, 3$^{rd}$ Int. Workshop, pp. 179-182, (1999).

Rubinstein, P. Penfiled et al., *Signal Delay in RC Tree Networks*, IEEE Trans. on CAD, vol. 2, No. 3, pp. 202-210, (Jul. 1983).

Runge, P.K., *Phase-Locked Loops with Signal Injection for Increased ull-In Range and Reduced Output Phase Jitter*, IEEE Transaction on Communications, vol. 24, No. 6, pp. 636-644, (Jun. 1976).

Rusu, S. et al., *The First IA-64 Microprocessor*, IEEE Journal of Solid State Circuits, vol. 35, No. 11, pp. 1539-1544, (Nov. 2000).

Sakurai, T, *Closed-form expression for interconnection delay, coupling, and cross-talk in VLSI's*, IEEE Trans. Electron Devices, vol. 40, pp. 118-124, (Jan. 1993).

Sakurai, T., *Alpha-Power Law MOSFET Model and its Applications to CM?OS Inverter Delay and Other Formulas*, IEEE Journal of Solid-State Circuits, vol. 25, No. 2, pp. 584-594, (Apr. 1990).

Seevinck, E. et al., *Current-Mode Techniques for High Speed VLSI Circuits with Application to Current Sense Amplifier for CMOS SRAM's*, IEEE Journal of Solid-State Circuits, vol. 26, No. 4, pp. 525-536, (Apr. 1991).

Sentinathan, R. et al., *Application specific CMOS output driver circuit design techniques to reduce simultaneous switching noise*, IEEE Journal of Solid State Circuits, vol. 28, No. 2, pp. 138301388, (Dec. 1993).

Stamper, A.K. et al., *Advanced Wiring RC Delay Issues for sub-0. 25-micron Generation CMOS*, International Interconnect Technology Conference, pp. 62-64, (1998).

Svensson, C. et al., *High speed CMOS chip to chip communication circuit*, IEEE Int. Symp. Circuits and Systems, Singapore, vol. 4, pp. 2228-2231, (1991).

Uzunoglu, V. et al., *Synchronous and the Coherent Phase-Locked Synchronous Oscillators: New Techniques in Synchronization and Tracking*, IEEE Transactions on Circuits and system, vol. 36, No. 7, pp. 997-1003, (1989).

Vaidyanath, A. et al., *Effect of CMOS Driver Loading Conditions on Simultaneous Switching Noise*, IEE Transactions on Components, Packaging, and manufacturing Technology, Part B., vol. 17, No. 4, pp. 480-485, (Nov. 1994).

Venkatesan, R. et al., *Optimal repeater insertion for n-tier multilevel interconnect architectures*, International Interconnect Technology Conference, pp. 132-134, (2000).

Zhang, H. et al., *Low-Swing On-chip Signaling Techniques: Effectiveness and Robustness*, IEEE Trans. VLSI, vol. 8, No. 3, pp. 264-272, (Jun. 2000).

* cited by examiner

Figure 8(a)
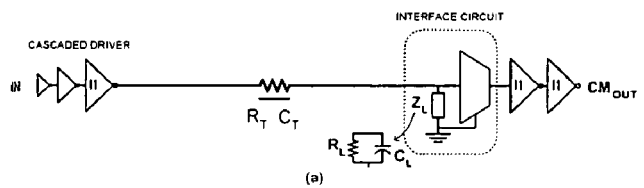
Figure 8(b)
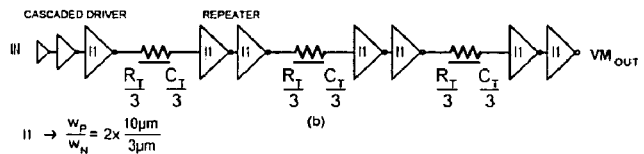
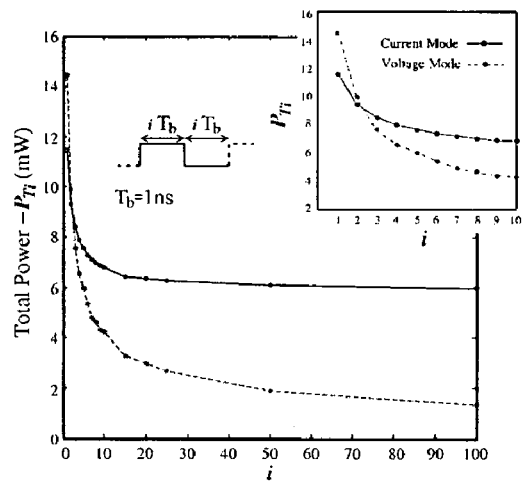
Figure 9

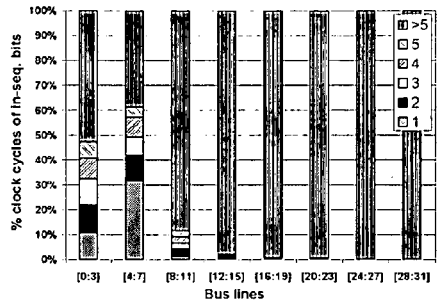
Figure 12(a)
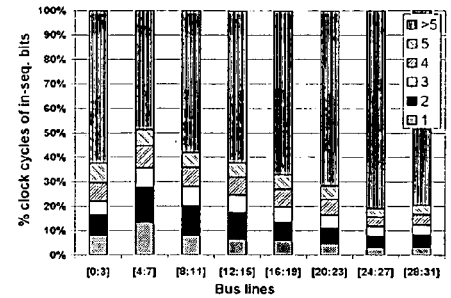
Figure 12(b)
Figure 13
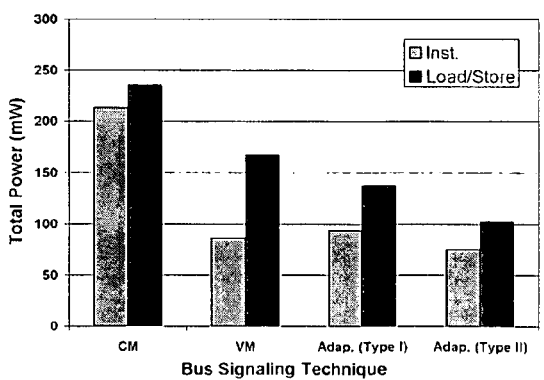
Figure 14

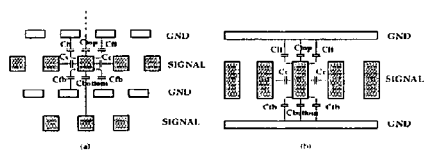
Figures 18(a) and (b)
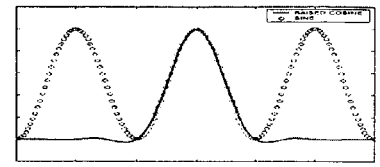
Figure 19
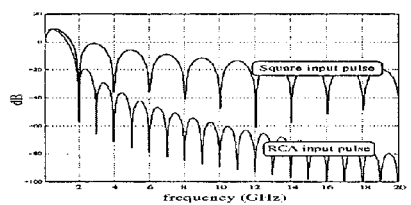
Figure 20
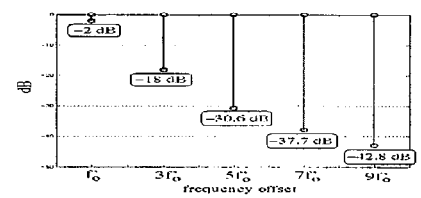
Figure 21
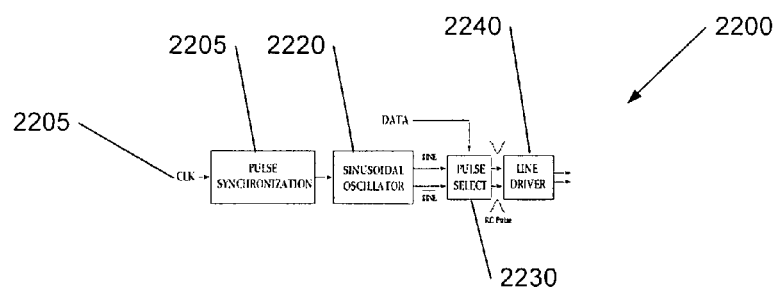
Figure 22

INTEGRATED CIRCUIT DEVICES HAVING ON-CHIP ADAPTIVE BANDWIDTH BUSES AND RELATED METHODS

FIELD OF THE INVENTION

The present invention relates generally to integrated circuit devices, and more particularly, to integrated circuit devices including buses and methods related thereto.

BACKGROUND OF THE INVENTION

Achieving low propagation delays and high signaling bandwidth in on-chip global interconnects may be increasingly important to high-performance microprocessors and embedded systems. However, low propagation delays and high signaling bandwidth may be increasingly difficult to achieve due to, for example, a 0.7X reverse-interconnect scaling trend, a fourteen percent increase in die (chip) size, and doubling of clock operating frequency per technology node. Typically, in order to achieve low propagation delays and increased throughput data transfers within computational units on-chip, repeaters are systematically inserted in long global buses. Often, however, repeater insertion is difficult or in some cases cannot be achieved due to placement blockages caused by underlying critical processing units, i.e. lack of space on-chip due to the presence of components that typically cannot be removed. Furthermore, repeater insertion distance may decrease with each technology node due to increased interconnect resistive effects, which may cause the overall improvement in delay and bandwidth to be undermined by an exponential increase in the number of repeaters on-chip and associated driver/repeater power dissipation.

Furthermore, as integrated circuits continue to be aggressively scaled, the number of gates per chip and clock frequencies may continue to increase. The increasing clock rates may exceed, for example, 10 GHz in 2011, and the trend toward larger die sizes exemplified in many microprocessor designs, typically result in longer average interconnect lengths which may increase the electrical distances to be traversed. A solution adopted by the industry to decrease the relative delay of interconnect lines has been to increase the aspect ratio of metal layers to reduce the resistance of on-chip interconnects. However, the increase in aspect ratio with each technology generation may progressively exacerbate signal integrity problems due to increase in the ratio of the coupling capacitance between adjacent conductors to the total capacitance.

Accordingly, cross-talk noise due to inductive and capacitive coupling effects may become increasingly important and may eventually become the dominant problem over local and global propagation delays. The potential problem due to cross-talk may be magnified due to reduced noise margins in modern high performance non-static logic circuits, for example, dynamic circuits with multiple phase clocks and pre-charge logics, which may be used to meet increased speed requirements.

The implementation of alternative solutions, such as using new materials to lower the progressive increase in resistance in interconnects, may show negligible impact on cross-talk noise. The use of low κ dielectrics has proven to reduce cross-talk noise almost proportionally to the reduction in permittivity. Nevertheless, the implementation of low resistivity materials and low κ dielectrics may still be subject to higher production costs. Alternatively, process scaling may impose the need for higher margins of cross-talk noise reduction, which may become progressively difficult on material and interconnect technology.

Other techniques, for example, are discussed in *Clocking Design and Analysis for a 600-MHz Alpha Microprocessor* by D. Bailey and B. Benschneider (IEEE Journal of Solid-State Circuits, Vol. 33, no. 11, pp. 1627–1633, November 1998.), the disclosure of which is hereby incorporated herein by reference. In this reference, on-chip power planes are placed between pairs of signal layers, which may sacrifice metal layers to shield signals from interlayer cross-talk. Nevertheless, the dynamic random access memory (DRAM) may pose some significant challenges due to the aggressive aspect ratios used in DRAM interconnects, leading to higher levels of noise coupling.

Accordingly, improved integrated circuit devices and methods that provide low propagation delays and/or high signaling bandwidth in on-chip global interconnects may be desired. Furthermore, integrated circuit devices and methods that may reduce cross-talk noise caused by inductive and/or capacitive coupling effects may also be desired.

SUMMARY OF THE INVENTION

Embodiments of the present invention provide an adaptive bandwidth bus that is configured to switch between a current mode of operation and a voltage mode of operation. In certain embodiments of the present invention, the adaptive bandwidth bus may be further configured to switch between a current mode of operation and a voltage mode of operation responsive to transitions of bits of an input data signal.

In some embodiments of the present invention, the adaptive bandwidth bus may further include a transition detector that is configured to detect the transitions of bits of the input data signal and at least one hybrid repeater. The at least one hybrid repeater may be configured to operate in the current mode of operation when at least one transition of at least one bit of the input data signal is detected. The at least one hybrid repeater may be configured to operate in the voltage mode of operation when no transitions of bits of the input data signal have been detected for a predetermined number of clock cycles ($C_p$).

In further embodiments of the present invention, the integrated circuit device may be configured to generate a control signal responsive to the detection of at least one transition of at least one bit of the input data signal. Furthermore, the at least one hybrid repeater may be further configured to switch to the current mode of operation responsive to the control signal.

In still further embodiments of the present invention, the predetermined number of clock cycles ($C_p$) may be determined based on an overall processing delay of the adaptive bandwidth bus. In certain embodiments of present invention, the overall processing delay may be determined based on a transition detector delay and/or a control signal delay.

In some embodiments of the present invention, the adaptive bandwidth bus may further include an input buffer. The bits of the input data signal may be stored in the input buffer so as to allow the at least one hybrid repeater time to switch from the voltage mode of operation to the current mode of operation if at least one transition of at least one bit of the input data signal is detected. In certain embodiments of the present invention, the input buffer may be a first in first out (FIFO) buffer and may have a depth equal to $C_p+1$. $C_p$ may be equal to 2 in some embodiments of the present invention.

In further embodiments of the present invention, a bandwidth of the adaptive bandwidth bus may be increased during the current mode of operation and the bandwidth of the adaptive bandwidth bus may be decreased during the voltage mode of operation. In certain embodiments of the present invention, the integrated circuit device further comprises a raised cosine transmitter that is configured to transmit a raised cosine approximation (RCA) signal as the input data signal. The RCA signal may include less than all frequencies of a Fourier transform of a corresponding square wave.

In still further embodiments of the present invention an integrated circuit device is provided that includes a plurality of data lines that are configured to operate in either current mode or voltage mode and at least one control line that is configured to identify whether at least one of the plurality of data lines is operating in current mode or in voltage mode.

In some embodiments of the present invention an integrated circuit device is provided that includes a driver that is configured to transmit a data input signal in a current mode or in a voltage mode responsive to a control signal. Similarly, in further embodiments of the present invention an integrated circuit device is provided that includes a receiver that is configured to receive a data input signal in a current mode or in a voltage mode responsive to a control signal.

In still further embodiments of the present invention, an integrated circuit device is provided that includes an adaptive bandwidth bus that is configured to automatically switch between a current mode of operation and a voltage mode of operation responsive to transitions of an RCA input data signal.

Some embodiments of the present invention provide methods of transmitting a signal over a bus. According to theses methods, a data input signal is received including a plurality of bits. The data input signal may be monitored so as to detect transitions of the plurality of bits and a bandwidth of the bus may be adjusted based on the detection of at least one transition of at least one of the plurality of bits of the input data signal.

Further embodiments of the present invention include methods of transmitting a signal on a bus where the method includes transmitting a data signal in a current mode or a voltage mode and transmitting a control signal to indicate whether the signal should be transmitted in the current mode or the voltage mode. Accordingly, embodiments of the present invention may provide improved integrated circuit devices and methods having low propagation delays, high signaling bandwidth in on-chip global interconnects and/or reduced cross-talk noise.

BRIEF DESCRIPTION OF THE DRAWINGS

FIGS. 8(a) and (b) are schematic diagrams illustrating SPICE simulation benchmarks for power analysis of the current and voltage mode, respectively, according to embodiments of the present invention;

FIG. 9 is a graph illustrating a power dissipation comparison of the current mode and voltage mode benchmarks illustrated in FIGS. 8(a) and 8(b) according to embodiments of the present invention;

FIGS. 12(a) and 12(b) are graphs illustrating benchmark bus statistics from simulations according to embodiments of the present invention;

FIG. 13 illustrates diagrams of control line designs for 32-bit adaptive bandwidth buses according to embodiments of the present invention;

FIG. 14 is a bar graph illustrating a total power vs. bus signaling technique according to embodiments of the present invention;

FIGS. 18(a) and 18(b) are diagrams illustrating interconnect wires having High $C_c/C_{int\ 1,\ 2}$ according to embodiments of the present invention;

FIG. 19 is a diagram illustrating exemplary raised cosine approximation (RCA) pulses according to embodiments of the present invention;

FIG. 20 is a diagram illustrating cross-talk noise spectrums for square and RCA input waveforms according to embodiments of the present invention;

FIG. 21 is a graph illustrating normalized power distribution of cross-talk noise for RCA input pulses with respect to square wave pulses at first through fifth harmonics;

FIG. 22 is a block diagram illustrating exemplary raised cosine transmitters according to embodiments of the present invention;

DETAILED DESCRIPTION OF EMBODIMENTS OF THE PRESENT INVENTION

Figure 1:
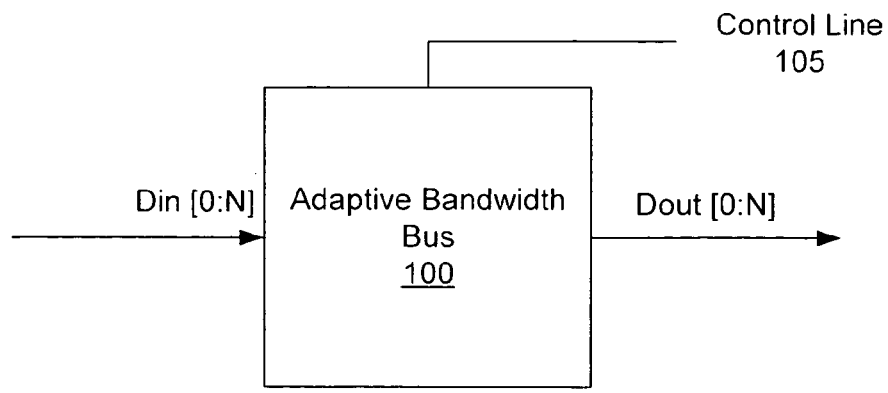
FIG. 1 is a high-level block diagram illustrating adaptive bandwidth buses according to some embodiments of the present invention.

The present invention will now be described more fully with reference to the accompanying drawings, in which embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, when an element is referred to as being "coupled" or "connected" to another element, it can be directly coupled or connected to the other element or intervening elements may be present. In contrast, when an element is referred to as being "directly coupled" or "directly connected" to another element, there are no intervening elements present. Like reference numerals refer to like elements throughout.

Embodiments of the present invention will be discussed below with respect to FIGS. 1 through 24. Embodiments of the present invention provide an adaptive bandwidth bus that is configured to switch between a current mode of operation and a voltage mode of operation. The adaptive bandwidth bus may be integrated in an integrated circuit package, i.e. on an integrated circuit chip. The on-chip bus architecture may be based on hybrid current/voltage mode repeaters. The adaptive bandwidth bus may be designed to increase (current mode) and/or decrease (voltage mode) the interconnection bandwidth responsive to a change in bus signal activity. Adaptively changing the bandwidth of the interconnects may reduce the overall power dissipation of the bus. Accordingly, the adaptive bandwidth bus may operate in the current-mode when the signal activity and the requested bandwidth is high and may switch to voltage-mode as the data activity and the requested bandwidth decreases as discussed further herein.

It will be understood that although adaptive bandwidth buses according to embodiments of the present invention are discussed below as being in integrated circuit devices, embodiments of the present invention are not limited to this configuration. For example, adaptive bandwidth buses according to embodiments of the present invention may be used inter-chip or off-chip without departing from the teachings of the present invention.

Referring now to FIG. 1, a high-level block diagram of adaptive bandwidth buses according to embodiments of the present invention will be discussed. As illustrated in FIG. 1, the adaptive bandwidth bus 100 may receive a plurality of input data bits Din[0:N]. The number of data bits supported by the adaptive bandwidth bus 100 may be, for example, sixteen or thirty-two. It will be understood that the number of data bits N supported by the adaptive bandwidth bus 100 may be any number of bits that may be feasibly supported by a data bus, the details of which are known to those of skill in the art and will not be discussed further herein. The adaptive bandwidth bus 100 may be configured to switch between a current mode of operation and a voltage mode of operation responsive to a control signal provided on a control line 105. The adaptive bandwidth bus 100 may transmit a plurality of output data bits Dout[0:N] in one of current mode of operation and voltage mode of operation. Adaptively changing from the current mode of operation to the voltage mode of operation may adaptively change the interconnection bandwidth given a change in input signal activity as discussed further herein. Since bandwidth is related to power dissipation, the adaptive bandwidth bus may provide energy efficient data transmission by expending a reduced power to support the bus signal activity.

Current-mode signal transporting can shift the pole position and reduce the system time constants that result from sensing signals with low impedance nodes. As used herein, for the purpose of signaling in on-chip interconnects, "current-mode" or "current sensing" refers to sensing a signal with a low impedance termination at the receive-end, which results in a shift in pole position that may increase the bandwidth of the line. On the other hand, for the purpose of determining the delay and/or bandwidth of a parallel terminated interconnect line, as shown in, for example, FIG. 2, "voltage mode" or "voltage sensing" refers to sensing a signal with a high impedance node at the receive-end. Thus, by letting a resistive element, for example, resistor $R_L$ of FIG. 2, approach infinity, the high impedance capacitively terminated line may be used to model the overall delay response due to a voltage mode receiver.

Figure 2:
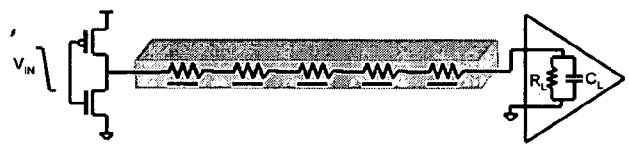
FIG. 2 is a schematic block diagram illustrating an inverter driven interconnect model for current and/or voltage mode signaling according to embodiments of the present invention.

To account for the change in system time constants due to the impedance termination of the line the resistor $R_L$, may added to the receiver as illustrated in FIG. 2. FIG. 2 is and an inverter driven interconnect model having an arbitrary receive-end termination for current and/or voltage mode signaling. If, for example, the driver and interconnect parameters remain unchanged, the parallel termination $R_L$ determines the impedance of the receiver and, thereby, determines whether the adaptive bandwidth bus 100 operates in the current mode of operation or the voltage mode of operation.

Closed-form expressions of delay and power dissipation for current mode (CM) and voltage mode (VM) signaling are discussed in, for example, *Delay and Power Model for Current-Mode Signaling in Deep Submicron Global Interconnects* by Bashirullah et al., the disclosure of which is hereby incorporated herein by reference as if set forth in its entirety. As discussed therein, the formulations are extended to take into account the effect of driver source capacitance ($C_S$) as illustrated in Equation (1), $$t_v = R_T C_T \frac{\ln\left[\frac{1.2 + 0.5(\eta_L/R_{LT})}{1-v}\right]}{1 + 1.0058 \ln\left[1.2 + 0.5\left(\frac{\eta_L}{R_{LT}}\right)\right]} \times \left\{\frac{\eta_L}{2}\left(1 + \frac{1}{3R_{LT}}\right) + \eta_L R_{ST}\left(1 + \frac{1}{2R_{LT}}\right) + \eta_S C_{ST}(1 + R_{LT}) + \eta_L C_{LT}(1 + R_{ST})\right\} \quad (1)$$

The delay ($t_v$) may be defined as the time from (t=0) to the time when the normalized voltage reaches v at the end of the line. $R_T$ and $C_T$ are the total interconnect resistance and capacitance and $R_S(R_L)$ and $C_S(C_L)$ are the source(load) resistance and capacitance, respectively. $R_{LT}=R_L/R_T$, $R_{ST}=R_S/R_T$, $C_{ST}=C_S/C_T$, and $C_{LT}=C_L/C_T$. $\eta_L=R_L/(R_L+R_S+R_T)$ and $\eta_S=R_S/(R_L+R_S+R_T)$ are defined as voltage loss factors of the load and source, respectively. The maximum Non-return to Zero (NRZ) data rate that can be supported by the line may be expressed as illustrated in Equation (2), $$f_{\max} = \frac{1}{t_{90}} \quad (2)$$

where $t_{90}$ is the 0–90% delay from Equation (1). Similarly, closed form expressions for dynamic and static power can be written as illustrated in Equations (3.a) and (3.b), $$P_{dyn} = (\eta_L V_{dd})^2 f \cdot act \left\{ C_L + C_S\left[1 + \frac{2R_T}{R_L} + \left(\frac{R_T}{R_L}\right)^2\right] + C_T\left[1 + \frac{R_T}{R_L} + \frac{1}{3}\left(\frac{R_T}{R_L}\right)^2\right]\right\} \quad (3.a)$$

$$P_{static} = \frac{\eta_L V_{dd}^2}{R_L} \quad (3.b)$$

In Equation (3.a), act is the activity factor. Equations (1)–(3) may be useful in determining performance trade-offs between voltage-mode (i.e. $R_L=\infty$) and current-mode (i.e. $R_L<<\infty$) interconnects. For example, for given values of $R_S$, $C_S$, $R_T$, $C_T$ and $C_L$, the maximum NRZ data-rate ($f_{max}$) may increase significantly as $R_L$ is reduced.

Figure 3:
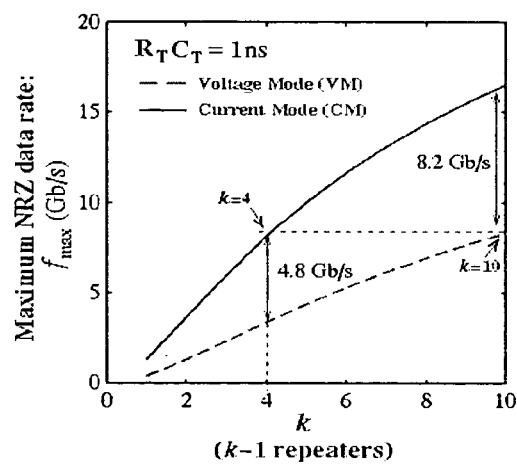
FIG. 3 is graph illustrating a data rate comparison of a current mode repeater and a voltage mode repeater according to embodiments of the present invention.

Referring now to FIG. 3, a graph comparing data rates for current and voltage mode repeater insertion interconnects will be discussed. As shown in FIG. 3, the improvement in $f_{max}$ using current mode sensing schemes is apparent, achieving target data-rates with nearly one third the number of voltage mode repeaters. As further illustrated in FIG. 3, three current mode repeaters may achieve nearly 4.8 Gb/s more NRZ bandwidth than three voltage mode repeaters, and may exhibit the same data rate performance as nine voltage mode repeaters. It will be understood that the graph illustrated in FIG. 3 is provided for exemplary purposes only. FIG. 3 illustrates an example of a signaling bandwidth improvement that current mode may have over voltage mode given certain source, interconnect and load parameters.

Figure 4:
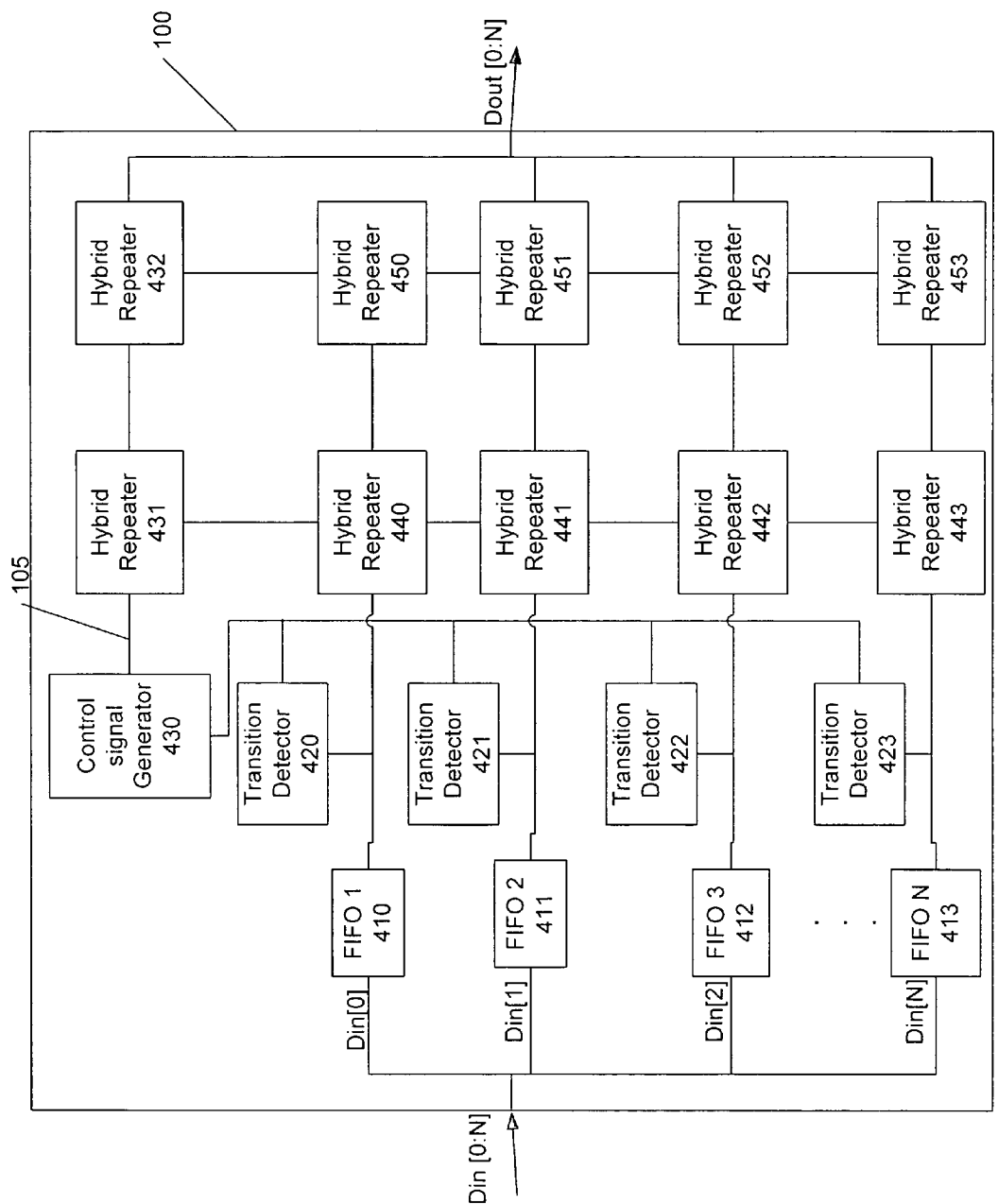
FIG. 4 is a more detailed block diagram illustrating adaptive bandwidth buses according to further embodiments of the present invention.

Referring now to FIG. 4, a more detailed block diagram of adaptive bandwidth buses according to further embodiments of the present invention will be discussed. As illustrated in FIG. 4, the adaptive bandwidth bus 100 may receive a plurality of input data bits Din[0:N]. As discussed above, the number of data bits supported by the adaptive bandwidth bus 100 may be, for example, on the order of sixteen or thirty-two. However, it will be understood that the number of data bits N supported by the adaptive bandwidth bus 100 may be any number of bits that may be feasibly supported by a data bus, the details of which are known to those of skill in the art and will not be discussed further herein. The adaptive bandwidth bus 100 may be configured to switch between a current mode of operation and a voltage mode of operation. In particular, the adaptive bandwidth bus may switch from the voltage mode to the current mode responsive to transitions of the plurality of input data bits. A bandwidth of the adaptive bandwidth bus may be increased during the current mode of operation. Similarly, the bandwidth of the adaptive bandwidth bus may be decreased during the voltage mode of operation. The adaptive bandwidth bus may be designed to increase and/or decrease the interconnection bandwidth responsive to a change in bus signal activity.

In particular, the plurality of input data bits D[0:N] are received and may be stored in a corresponding data buffer, for example, a first in first out (FIFO) buffer. For example, a first data bit Din[0] may be stored in a first FIFO 410, a second data bit Din[1] may be stored in a second FIFO 411, a third data bit Din [2] may be stored in a third FIFO 412 and an Nth data bit Din [N] may be stored in the Nth FIFO 413. First through Nth transition detectors 420, 421, 422 and 423, associated with ones of the first through Nth FIFOs 410, 411, 412 and 413, respectively, may be configured to detect transitions of the plurality of input data bits Din[0:N]. In other words, the transition detectors 420, 421, 422 and 423 may monitor the input data and wait for a change in the input data bits D[0:N], for example, 0 to 1 or 1 to 0. When one of the transition detectors 420, 421, 422 and 423 detects a change, a control signal generator 430 asserts a control signal on the control line 105.

It will be understood that although embodiments of the present invention illustrated in FIG. 4 include a single control signal generator 430, embodiments of the present invention are not limited to this configuration. For example, the input data bits D[0:N] may be divided into a plurality of sets of data bits. These sets of data bits may be individually monitored by a dedicated set of transitions detectors and may each have a dedicated control signal generator that may generate a control signal when a transition of one or more of the bits in the set of data bits is detected.

The control signal may be communicated to one of a first plurality of repeaters 431, 440, 441, 442 and 443. Thus, the control signal may be communicated to the first plurality of repeaters 431, 440, 441, 442 and 443 and may cause the repeaters 440, 441, 442 and 443 to switch to current mode because the adaptive bandwidth bus 100 is receiving data, i.e. a transition of at least one data bit has been sensed to indicate that data is being received.

The repeaters 431, 440, 441, 442 and 443 may be hybrid current/voltage repeaters. The repeaters 440, 441, 442 and 443 associated with the data lines may be configured to operate in the current mode of operation when at least one transition of the plurality of input data bits is detected, i.e. when the control signal generator 430 generates the control signal on the control line 105. The repeaters 440, 441, 442 and 443 may be further configured to switch back to and operate in the voltage mode of operation when no transitions of bits of the input data signal have been detected for a predetermined number of clock cycles ($C_p$). The predetermined number of clock cycles ($C_p$) may be determined based on an overall processing delay of the adaptive bandwidth bus as discussed further below. It will be understood that the repeater 431 associated with the control line 105 may be similar to the repeaters 440, 441, 442 and 443 associated with the data lines. However, the repeater 431 and the associated control line 105 may operate continuously in current mode. The FIFO buffers 410, 411, 412 and 413 may have a depth equal to $C_p+1$ to allow the hybrid repeaters time to switch from voltage mode to current mode when data has been received, i.e. when a transition has been detected and a control signal has been generated.

The plurality of data input bits Din[0:N] may propagate through a plurality of repeaters before being transmitted from the adaptive bandwidth bus as a plurality of output data bits Dout[0:N]. For example, as illustrated in FIG. 4, after the plurality of data input bits Din[0:N] have propagated through the first plurality of hybrid current/voltage repeaters 431, 440, 441, 442 and 443, the plurality of data input bits Din[0:N] may propagate through a second plurality of hybrid current/voltage repeaters 432, 450, 451, 452 and 453. It will be understood that although FIG. 4 illustrates a series of two hybrid current/voltage repeaters, embodiments of the present invention are not limited by this configuration. One or more repeaters may be used without departing from the teachings of the present invention.

Figure 5:
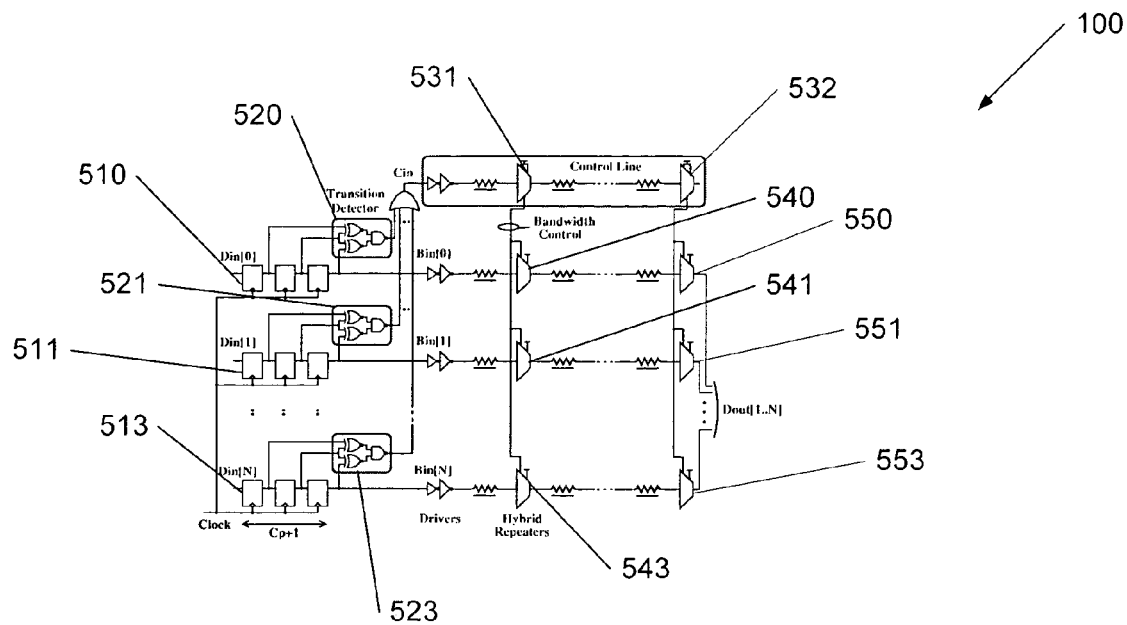
FIG. 5 is a schematic diagram illustrating adaptive bandwidth bus architecture according to embodiments of the present invention.

Referring now to FIG. 5, a schematic diagram illustrating an architecture of adaptive bandwidth, buses according to some embodiments of the present invention will be discussed. As illustrated in FIG. 5, an adaptive bandwidth bus 100 according to embodiments of the present invention may include at least one buffer, for example, FIFO 510, 511, 513 having a depth equal to $C_p+1$ clock cycles, at least one digital transition detector 520, 521, 523, at least one control line Cin and at least one hybrid current/voltage mode repeater 531, 540, 541, 543. The input to the control line Cin may set the operation of the hybrid repeaters 531, 540, 541, 543 in either voltage or current-mode. In the event of input data transitions (Din[0], Din[1], . . . Din[N]), the transition detectors activate the control line Cin to set the bus lines in current mode. Similarly, in the absence of data transitions, the bus lines are set to voltage mode. In particular, if the data Din[0:N] does not change for Cp clock cycles, the bus lines automatically shift to voltage mode operation, which may reduce the static power dissipation of the adaptive bandwidth bus 100. In order to decrease circuit overhead, ones of the control line Cin is shared among N+1 bus lines.

Figures 6A, 6B:
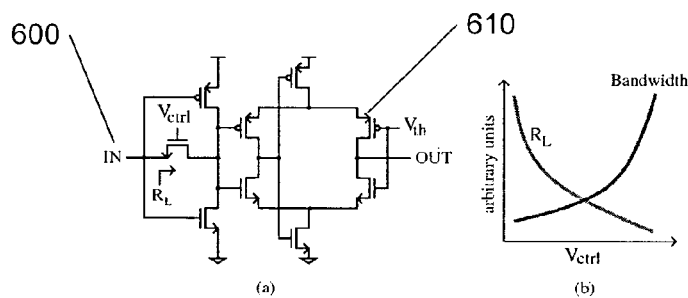
FIG. 6(a) is a schematic diagram of hybrid current/voltage repeaters according to embodiments of the present invention.
FIG. 6(b) is a graph illustrating a termination resistance ($R_L$) and interconnection bandwidth vs. $V_{ctrl}$ according to embodiments of the present invention.

Referring now to FIG. 6(a), a schematic block diagram of a hybrid current/voltage mode repeater 531, 540, 541, 543 according to embodiments of the present invention will be discussed. When a control voltage ($V_{ctrl}$) of the input stage 600 is below a threshold voltage $V_{th}$ of the feedback transistor 610, the hybrid current/voltage mode repeater 531, 540, 541, 543 may operate as a regular full-swing voltage-mode inverter. As the control voltage $V_{ctrl}$ increases, the feedback transistor 610 turns on and the hybrid current/voltage repeater operates as a self-biased inverter. The termination resistance ($R_L$) looking into the repeater decreases as the control voltage $V_{ctrl}$ increases, thereby shifting the pole frequency of the interconnect line which has the effect of increasing the bandwidth, as illustrated in FIG. 6(b).

It will be understood that the hybrid current/voltage mode repeater illustrated in FIG. 6(a) is provided for exemplary purposes only and that embodiments of the present invention are not limited to this configuration. For example, any circuit topology that exhibits behavior similar to the behavior of the circuit illustrated in FIG. 6(a) may be used as a hybrid current/voltage mode repeater according to embodiments of the present invention. In other words, when an appropriate control voltage is applied to the repeater, the input impedance may be high for voltage mode operation and low for current mode operation.

Figure 7:
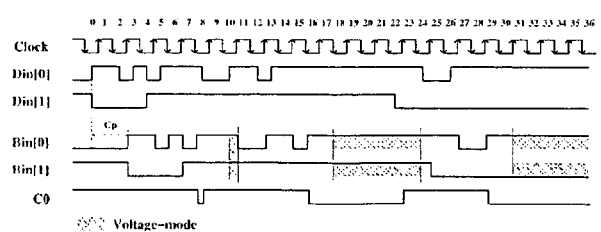
FIG. 7 is a timing diagram of illustrating timing operations of adaptive bandwidth buses according to embodiments of the present invention.

Referring now to FIG. 7, a timing diagram illustrating operations of adaptive bandwidth buses according to embodiments of the present invention will be discussed. As used herein, a "clock cycle" refers to the system sampling time. The data may be sampled at both positive and negative edges of the clock as illustrated in FIG. 7. It will be understood that although the timing diagram of FIG. 7 assumes that two bus lines Din[0] and Din[1] share the same control line C0, bus lines according to embodiments of the present invention may be controlled by separate control lines as discussed above. As illustrated in FIG. 7, the input data is delayed by Cp clock cycles to allow for the transition detectors 420, 421, 422 and 423 and control line Cin to update the hybrid repeater's mode of operation. As discussed above, $C_p$ may be calculated using the overall processing delay of the path determined by the transition detectors 420, 421, 422 and 423 and control line Cin. Since the control line Cin is similar to the bus lines and typically operates continuously in current mode, only the first repeater of the bus lines may be updated before the delayed input data Bin [0:N] can be launched. As the control signal C0 propagates, it may update the subsequent hybrid current/voltages repeater stages 532, 550, 551 and 553 of the bus lines, similar to, for example, a domino effect. Accordingly, the latency of the processing delay from current mode to voltage mode or vice-versa may be reduced.

In some embodiments of adaptive bandwidth buses according to embodiments of the present invention, it may be possible to launch more than a single transition before the preceding transitions reach the end of the bus line. This technique is similar to wave-pipelining as discussed in, for example, *Timing constraints for wave-pipelined Systems* by Gray et al. (IEEE Trans. Comp. Aided. Design, vol. 13, no. 8, pp. 987–1004, August 1994) and *A 250-MHz wave pipelined adder in 2-/spl mu/m CMOS* by Liu et al. (IEEE J. Solid-State Circuits, vol. 29, no. 13, pp. 1117–1128, September 1994), the disclosures of which are incorporated herein by reference as if set forth in their entirety. The technique is similar to wave pipelining because multiple sequential transitions or "waves" may propagate simultaneously in the bus lines. It will be understood that in certain embodiments of the present invention for all transitions to be detected correctly at the end of the bus line, the operation mode of the receiving repeaters are typically updated to current-mode prior to launching the pulses. In addition, proper synchronization is useful when sampling and capturing the transitions at the receiving end of the bus.

In embodiments of the present invention illustrated in FIG. 7, Cp is assumed to be two cycles long. On the falling edge of the control signal C0, the line switches to voltage mode after approximately two cycle delays, indicated by the shaded regions of FIG. 7. Furthermore the data bus lines switch to current mode operation whenever an input transition is detected, and remains in voltage mode operation in the absence of transitions for more than Cp cycles.

Referring now to FIGS. 8(a) and 8(b), exemplary SPICE simulation benchmarks for power analysis in current and voltage modes according to embodiments of the present invention will be discussed. To evaluate the overall power dissipation performance of current and/or voltage mode signaling for on-chip interconnects, a circuit-level test benchmark designed in TSMC 0.35 µm technology with $V_{dd}$=3V was used, as shown in FIGS. 8(a) and 8(b). The interconnect line is a metal-3 layer wire and metal-2 ground with a length of 1 cm, modeled by a 1000 segment distributed RC line. The resulting total resistance ($R_T$) and capacitance ($C_T$), including fringing capacitance, is given by 175Ω and 2.56 pF, respectively. To fairly compare the power dissipation performance of both schemes, we added inverters I1 after the current-mode receiver interface circuit. The inverters are sized with Wp=2×10 µm and Wn=2×3 µm and minimum drawn length of L=0.4 µm. The target maximum data rate was set at 1 Gb/s (i.e. bit time $T_b$=1 ns), which requires at least two voltage mode repeaters, whereas no repeaters were required for current mode signaling. The circuit topology of the current mode receiver and complementary metal-oxide semiconductor (CMOS) level swing conversion circuit is illustrated in FIG. 6(a).

Referring now to FIG. 9, a graph illustrating a comparison of power dissipation of the current and voltage modes according to embodiments of the present invention will be discussed. The overall power dissipation performance of the test benchmark for several i, where i represents the number of cycles in bit times $T_b$ for which the logical level remains unchanged will be discussed with respect to FIG. 9. At relatively large i, the voltage mode line in FIG. 8(b) exhibits lower overall power dissipation than the current mode line in FIG. 8(a). This is due to the static power dissipation inherent to parallel resistive termination of current mode signaling. However, as i is decreased, the dynamic power dissipation of full-swing voltage mode signaling may dominate. For this example, the crossover point occurs at approximately i=2.5 or $T_b$=2.5 ns, which is equivalent to a bus frequency of 200 MHz (i.e. ⅕ ns), which is relatively small compared to conventional GHz processors.

Furthermore, the slope at which the power dissipation increases is smaller for the current mode signaling case, a result that may be due to the reduced voltage swing in the interconnect line. It will be understood that unlike low-swing voltage mode signaling schemes, current mode signaling reduces the voltage swing while enhancing the bandwidth of the line. The results illustrated in FIG. 9 suggest that current mode signaling may be beneficial at higher signaling data-rates.

Figure 10A:
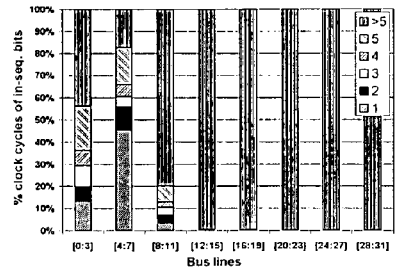
FIGS. 10(a) through 10(c) are graphs illustrating bus transition statistics of adaptive bandwidth buses according to embodiments of the present invention.
Figure 10B:
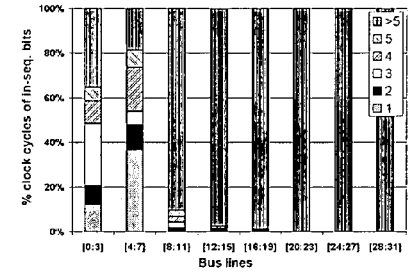
Figure 10C:
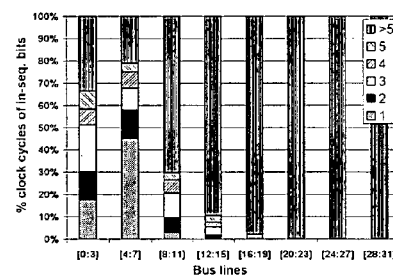

Referring now to FIGS. 10(a), 10(b) and 10(c), graphs that illustrate bus transition statistics will be discussed. FIGS. 10(a), 10(b) and 10(c) are three graphs that illustrate simulated benchmarks using SPEC2000 test suite. An Alpha 21264 machine was simulated using SimpleScalar 2.0 and modified the timing simulator "sim-outorder.c" module to extract instruction addresses. Three benchmarks from the SPECINT2000 test suite, MCF (Combinatorial Optimization), PARSER (word-processor) and GZIP (compression), were used for the simulation results. A total of 100 million 32-bit instruction addresses were collected for each benchmark. The instruction addresses were divided into half-bytes (4-bits) and the number of clock cycles before each 4-bit pattern change was accumulated. The percentage of clock cycles of in-sequence half-bytes is shown in FIGS. 10(*a*), (*b*) and (*c*) for each benchmark. In FIGS. 10(*a*), (*b*) and (*c*), each bar is divided into 1, 2, 3, 4, 5 and greater than 5 clock cycle bins. For instance, "1" refers to the percentage of total simulated clock cycles in which a 4-bit pattern remains unchanged for 1 cycle, "2" refers to the percentage of total simulated clock cycles in which a 4-bit pattern remains unchanged for 2 cycles, and so forth. The results show a high correlation of switching activity for the lower order bits, whereas the higher order bits remain nearly unchanged for the entire instruction streams.

$P_{TNi}$ denotes the root mean square (RMS) power dissipation of N bus lines given that the bits remain unchanged for i clock cycles, and $p_{rNi}$ denotes the probability defined as the percentage of total simulated clock cycles in which the N bus lines remain unchanged for i clock cycles (i.e. as depicted in FIGS. 10(*a*), (*b*) and (*c*)). Since the adaptive bandwidth bus operates in current mode or voltage mode, the overall power dissipation may be obtained by adding the fraction of power for which the bus operates in current-mode ($P_{CM\_N}$) and the fraction of power for which the bus operates in voltage-mode ($P_{VM\_N}$). Assuming that the adaptive bandwidth bus requires Cp clock cycles to update the bus lines from current mode to voltage mode, the total power dissipation of N bus lines operating in current mode when i≦Cp is illustrated by Equation (4), $$P_{CM\_N} = \sum_{i=1}^{Cp} p_{rN_i} P_{TN_i} \quad (4)$$

Similarly, the total power dissipation of N bus lines operating in voltage mode when i>Cp is illustrated by Equation (5), $$P_{VM\_N} = \sum_{i=Cp+1}^{Nc} \frac{Cp}{i} p_{rN_i} P_{TN_i} \quad (5)$$

where Nc is the total number of simulated clock cycles. Notice that in Equation (5), $P_{VM\_N}$ is not assumed to be negligible even though the bus operates in voltage mode. The reason for this is that the bus remains in current mode for at least Cp cycles even after the switching to voltage mode, due to the finite update time of Cp cycles. As a result, $P_{TNi}$ in (5) can be reduced to Equation (6), $$P_{TN = pTN_{Cp}} i > Cp \quad (6)$$

From Equations (4) through (6), the total power dissipation of N bus lines can be rewritten as, $$P_{total\_N} = \sum_{i=1}^{Cp} p_{rN_i} P_{TN_i} + Cp \cdot P_{TN_{Cp}} \sum_{i=Cp+1}^{Nc} \frac{p_{rN_i}}{i} \quad (7)$$

In Equation (7), $p_{rNi}$ and Nc are obtained from the simulated bus statistics, whereas $P_{TNi}$ can be extracted from SPICE simulations. Notice that by letting Cp approach Nc, Equation (7) can also be used to determine the power dissipation of the bus when operating entirely in current mode or entirely in voltage mode.

For the purpose of comparison, it may be assumed that $P_{TNi}$=N $P_{Ti}$, where $P_{Ti}$ is the power dissipation of a single bus line as depicted in FIG. 6. The definition of $P_{TNi}$ is the worst-case power dissipation since it assumes that all bus lines transition simultaneously.

Figure 11A:
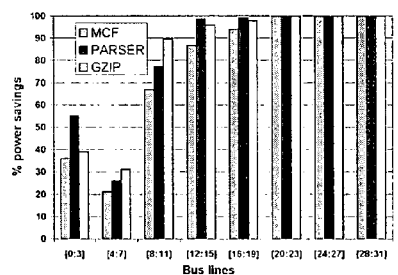
FIGS. 11(a) and 11(b) are graphs illustrating the percent reduction in power dissipation of the adaptive bandwidth according to embodiments of the present invention over the current mode bus.
Figure 11B:
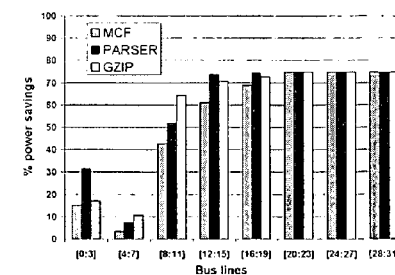

Referring now to FIGS. 11(*a*) and 11(*b*), graphs illustrating percent reduction in power dissipation of adaptive hybrid current/voltage mode buses according to embodiments of the present invention over conventional current mode buses will be discussed. The adaptive bandwidth bus uses one control line per four bus lines. FIG. 11(*a*) illustrates performance without power dissipation of control lines and FIG. 11(*b*) illustrates performance with control lines included. To verify the savings in power dissipation of the adaptive bandwidth bus technique over a current-mode bus, results based on Equation (7), set out above, for the benchmark tests are illustrated in FIGS. 11(*a*) and 11(*b*). In this example, the adaptive bandwidth bus uses one control line to update the state of four bus lines (i.e. total of 8 control lines for 32 bus lines). The control lines operate in current-mode and are assumed to be identical to the bus lines, with an update time latency of 3 cycles (i.e. Cp=3). FIG. 11(*a*) and 11(*b*) illustrate the power savings without and with the added power of the control lines, respectively, indicating that higher performance gains could be obtained by reducing the total number of control lines. The mean power savings of all three simulated benchmarks including control lines may be over 50%.

The results depicted in FIGS. 11(*a*) and (*b*) indicate that the static power dissipation inherent to current sensing techniques, most dominant in bus lines with low switching activity, can be reduced with an adaptive bandwidth bus according to embodiments of the present invention. However, address buses may also exhibit low probability of in-sequence address streams, as in the case of data addresses (i.e. load/stores). When the probability of sequential addresses is very low, the switching activity of the higher order bits in the bus lines may increase. This behavior is illustrated in FIGS. 12(*a*) and (*b*), where the percentage of clock cycles of in-sequence half-bytes for instruction and data addresses are shown for the GCC benchmark (i.e. C Programming Language Compiler). As illustrated in FIG. 12(*a*), the instruction addresses illustrate a high correlation of switching activity for the lower order bits, which indicates a higher spatial locality amongst the address streams since instructions are usually stored in adjacent locations of memory. On the other hand, as shown in FIG. 12(*b*), data addresses exhibit a more uniform switching activity distribution within the bus lines, representative of a lower probability of in-sequence address streams.

To examine the effect of varying switching activity distribution within bus lines on power dissipation, the performance of the adaptive bandwidth bus may be compared against both voltage mode and current mode signaling schemes. Referring now to FIG. 13, control line designs for 32-bit adaptive bandwidth buses according to embodiments of the present invention will be discussed. The type-I adaptive bandwidth bus consists of 8 control lines, each one used to update the signaling state (i.e. CM or VM) of 4 bus lines. Alternatively, the type-II adaptive bandwidth bus uses 2 control lines, each one updating the state of 16 bus lines. The main difference between the two control line design approaches, apart from the obvious reduction in the number of control lines, is that a type-II bus will shift from current mode to voltage mode when all 16 bus lines remain inactive for more than Cp clock cycles, whereas in a type-I bus only 4 bus lines need to be inactive for the bus to shift from current mode to voltage mode. Thus, the probability that a type-II adaptive bandwidth bus will remain in current mode operation for a longer fraction of total simulated clock cycles is likely to be higher than the type-I bus.

Referring now to FIG. 14, a bar graph illustrating the total power dissipation comparison for the GCC benchmark according to embodiments of the present invention will be discussed. The overall power dissipation performance of a 32-bit wide bus for simulated statistics of the GCC benchmark is shown in FIG. 14. The following observations can be inferred from these results. First, the current mode bus exhibits the highest power dissipation, nearly 2.5 and 1.4 times higher than the voltage mode bus for instruction and data addresses, respectively. This may be due to static power dissipation of current mode signaling. However, the relative change in power dissipation for instruction and data address streams is only 10% for the current mode bus whereas the voltage mode bus changes by 94%. This may indicate that current mode signaling is more suitable for increasing switching activity, an effect due to the reduction in voltage swings.

Second, the type-II adaptive bandwidth bus outperforms the type-I bus for both instruction and data address streams in the example simulations discussed herein. The type-II bus remains in current mode operation for a longer percentage of total simulated clock cycles because the probability of all 16 bus lines remaining inactive is likely to be lower than 4 bus lines remaining inactive. However, there is an increase in power dissipation due to the additional control lines of the type-I bus, making the type-II bus more suitable.

Third, the type-II bus exhibits nearly 13% and 40% improvement over the voltage mode bus for both instruction and data address streams, respectively, and up to 65% power savings over the current mode bus.

In addition to the power savings of the adaptive bandwidth bus technique, an important result that stems from using current mode signaling is the reduction in the number of repeaters. As illustrated in Table I, which illustrates the total number of repeaters and receivers for several bus signaling schemes, the 32-bit type-II adaptive bandwidth bus can achieve the target data rate of 1 Gb/s across a 1-cm long wire with 34 instead of 96 repeaters/receivers typically used for the voltage mode bus.

TABLE I

|  | CM | VM | Adaptive (Type-I) | Adaptive (Type-II) |
|---|---|---|---|---|
| Number of Repeaters + Receivers | 32 | 96 | 32 + 8 = 40 | 32 + 2 = 34 |

Accordingly, adaptive bandwidth buses according to embodiments of the present invention may provide a new bus architecture based on hybrid current/voltage mode signaling to increase data rates while decreasing the number of repeaters by, for example, nearly a third. As discussed above, current-mode signaling uses low-impedance receive-end termination to shift the pole position of the line, thereby achieving high transmission bandwidths. Thus, relatively high data-rates can be attained despite the continuing reverse interconnect scaling trends. To compensate for the increase in static power dissipation inherent to current sensing, adaptive bandwidth buses according to embodiments of the present invention adaptively change the mode of operation from current to voltage when the signal activity is low and from voltage to current mode otherwise. Thus, the bus energy expenditure can be decreased to support the actual bus signal activity.

A low-power design methodology based on circuit-level power estimation and statistical analysis of address streams for typical benchmarks extracted using a time-based Alpha 21264 simulator, reveal an improvement in power dissipation of up to 65% and 40% for current and voltage mode signaling, respectively. Overall power dissipation improvement may be attained over voltage-mode signaling schemes because at high data rates, the dynamic power dissipation of full-swing signals can become significant. Conversely, the rate at which the power dissipation increases with signaling frequency is much smaller for current sensing, an effect owed to the reduced signal swings.

It will be understood that adaptive bandwidth buses, simulations and examples discussed above with respect to FIGS. 1 through 14 are provided for exemplary purposes only and that embodiments of the present invention are limited by these examples.

Embodiments of the present invention discussed above with respect to FIGS. 1 through 14 may address the power and bandwidth limitations of conventional integrated circuit devices, but may not address the increasing problems with cross-talk noise present in conventional integrated circuits. Accordingly, in certain embodiments of the present invention, a raised cosine approximation (RCA) signal may be used as the data input signal of the integrated circuit device. In other words, a conventional square wave may be replaced by, for example, a first and a second frequency of a Fourier transform of the square wave. This technique may have the effect of decreasing cross-talk noise in highly integrated circuit devices as discussed further below.

The scheme uses band-limited basis waveforms or RCA pulses to decrease cross-talk noise due to higher frequency components present on-chip. Simplified interconnect modeling may illustrate that this technique is particularly beneficial for high-density local and global interconnects. Simulation results, discussed below, predict a reduction of approximately 18 dB of sideband noise power at three times the fundamental frequency ($3f_o$).

In order to overcome the performance limitations of traditional high density interconnects, changes may be made to decrease the cross-talk noise of interconnection buses. Problems encountered from the presence of noise cross-talk in high-density interconnect lines may be addressed by using communication techniques to change the basis waveforms used for data transfer via buses.

In particular, data transfer in digital communication systems typically involves the construction of orthogonal basis functions and mapping these functions into a vector space to form a signal constellation. Typically, square pulses are used as basis functions or waveforms due to their simplicity in generation and their moderate complexity in detection. In certain embodiments of the present invention, square basis waveforms may be replaced by RCA pulses. In some embodiments, an RCA pulse is band-limited to within two times its fundamental ($2f_o$) frequency. It will be understood that the RCA pulse may include more or less than the first and second frequencies ($2f_o$) as long as it includes less than all the frequencies. As discussed below, band-limiting the transmitted pulses may allow cross-talk noise due to unnecessary higher frequency components (i.e. square pulses) to be reduced. Accordingly, according to certain embodiments of the present invention, wide bus interconnections may be optimized for low RC delays (i.e. large aspect ratios interconnects), which can improve signal latencies and group delays.

Figures 15A, 15B:
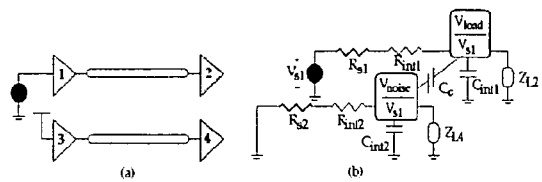
FIG. 15(a) is a schematic diagram illustrating driver/interconnect models according to embodiments of the present invention.
FIG. 15(b) is a schematic diagram of an equivalent circuit model of two adjacent drivers according to embodiments of the present invention.

Now referring to FIGS. 15(*a*) and (*b*), schematic diagrams illustrating equivalent cross-talk models for two adjacent drivers will be discussed. The cross-talk model for the two driven interconnects illustrated in FIGS. 15(*a*) and (*b*) was used to investigate the impact of a near-field coupling problem to within a first order approximation. In this analysis, current-mode drivers were used (i.e. $Z_{L2}$ and $Z_{L4}$ are complex). However, purely capacitive loads for voltage-mode signaling may also be incorporated. Assuming $C_c$ is the coupling capacitance between two wires, with $C_{int1}$ and $C_{int2}$ being the effective area capacitances between the respective interconnects and ground, i.e. the substrate. The input loads of receivers 2 and 4 of FIG. 15(*a*) are given by $Z_{L2}$ and $Z_{L4}$, respectively. The driver output resistances $R_{1S}$ and $R_{2S}$ may be combined with their respective interconnect resistances $R_{int1}$ and $R_{int2}$ to form their effective line resistances.

Figure 16:
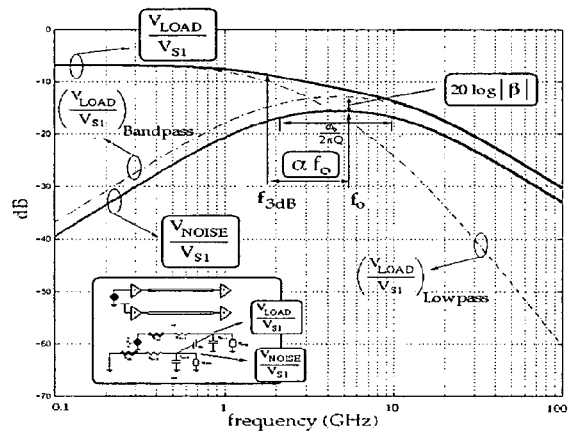
FIG. 16 is a graph illustrating frequency response of aggressor and victim lines according to embodiments of the present invention.

The resulting signal and cross-talk noise transfer functions are given by $V_{NOISE}(s)/V_{S1}(s)$ and $V_{LOAD}(s)/V_{S1}(s)$, respectively, as illustrated in FIG. 16. FIG. 16 is a graph illustrating frequency response of aggressor and victim lines according to embodiments of the present invention. Furthermore, $V_{LOAD}(s)/V_{S1}(s)$ can be viewed as the sum of two separate transfer functions given by its low-pass and band-pass components illustrated by the dashed lines in FIG. 16. Parameters α and β may be provided by Equations (8) and (9), respectively, $$\alpha = \frac{f_o - f_{3dB}}{f_o}, \quad \beta = \frac{C_C}{C_C + C_{int\,1,2}} \qquad (8),(9)$$

where α and β are the frequency offset and cross-talk insertion-loss factors, $f_O$ and $f_{3dB}$ are the maximum gain and 3 dB frequencies of $V_{NOISE}(s)/V_{S1}(s)$ and $V_{LOAD}(s)/V_{S1}(s)$, respectively, and $C_c$ and $C_{int1,2}$ are the coupling and interconnect capacitances. The parameter a is a measure of the frequency deviation between the noise (i.e. $f_O$ for $V_{NOISE}(s)/V_{S1}(s)$) and signal (i.e. $f_{3dB}$ for $V_{LOAD}(s)/V_{S1}(s)$) transfer functions, whereas 1 represents an insertion-loss factor due to the ratio of the coupling capacitance between adjacent conductors to the total capacitance (i.e. $C_c/C_{int1,2}$). For example, if the spacing between two interconnects is large, its coupling capacitance $C_c$ is typically small, which may result in a small insertion-loss factor β (i.e. 20log |β|<<0). That is, very little noise is coupled to the victim line.

Figure 17:
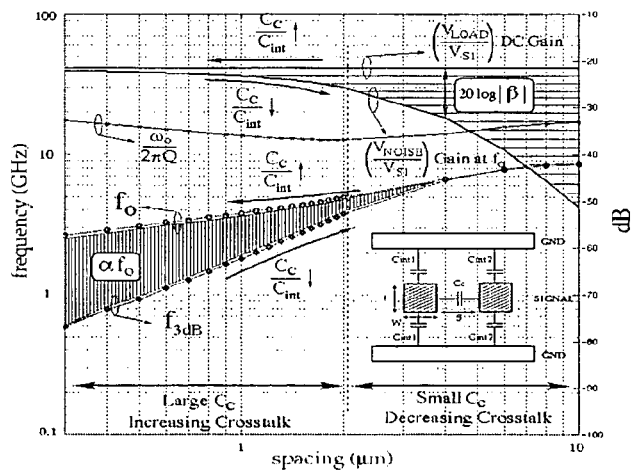
FIG. 17 is a graph illustrating cross-talk frequency offset and loss factors vs. spacing according to embodiments of the present invention.

Referring now to FIG. 17, a graph illustrating cross-talk frequency offset and loss factors vs. spacing according to embodiments of the present invention will be discussed. Furthermore, FIG. 17 illustrates the dependence of a and 1 versus interconnect spacing for a typical 0.18 μm Aluminum process. Interconnect lines can also be realized with a low resistance copper process to obtain improved operating bandwidths, or alternatively, for the same 3 dB frequency ($f_{3dB}$), a reduction in interconnect spacing (higher $C_c$) can be implemented to achieve higher interconnect densities. To estimate the effect of interconnect wires with large aspect ratios or equivalently high $C_c/C_{int1,2}$ ratios, as illustrated in FIGS. 18(*a*) and 18(*b*), the cross-talk transfer function parameters α and β are analyzed in more detail.

As illustrated in FIG. 17, an improved situation is given by large interconnect spacing where the cross-talk loss factor β is small. As the spacing is reduced and the $C_c/C_{int1,2}$ ratios are increased, both the cross-talk loss factor β and the frequency offset factor α may increase. The increase in β and α may imply a larger susceptibility of the victim line to high-frequency noise. To be more specific, the increase in β may imply that the victim line is more susceptible, and the increase in a may imply that the susceptibility due to higher frequency noise tends to be larger. This suggests, that in a high $C_c/C_{int1,2}$ interconnect environment, the cross-talk noise can be decreased if band-limited signaling such as the RCA pulses is used instead of square pulses.

Thus, using RCA pulses according to embodiments of the present invention may take advantage of the increased frequency offset a by band-limiting the transmitted pulses to reduce cross-talk noise. Typically, as implemented in most wireless radio frequency (RF) transceivers, this is achieved by pre-filtering the transmitted waveforms to obtain a smooth spectral roll-off. The most common example in practice is the raised cosine pulse, illustrated, for example, in FIG. 19 by the solid line. The raised cosine pulse illustrated in FIG. 19 has an excess bandwidth of 100%, i.e. the pulse bandwidth is contained to within two times its fundamental frequency. The effect is to reduce the tails of the pulse, which decay asymptotically in time as $1/t^3$.

Typical realizations of Raised Cosine Filters (RCF) are achieved with Switched Capacitor (SC) implementations of Finite Impulse Response (FIR) filters and high order analog active filters. However, switched capacitors and active based filter implementations are typically very slow, since they may use at least one feedback op-amp. Furthermore, digital FIR raised cosine filters typically use a large number of taps to implement delays/coefficients and, typically, are sampled at relatively low frequencies, for example, less than 1 GHz.

Since data rates of several Gigabits per second may be used, traditional implementations of raised cosine filters may not be desirable. Thus, some embodiments of the present invention use a scheme to approximate the time domain raised cosine pulse with a single period of a high frequency sinusoidal waveform, as illustrated, for example, in FIG. 19 by the circles. By properly synchronizing the sinusoidal pulse selection with the on-chip clock, a random band-limited data sequence can be sent through the channel.

Referring now to FIG. 20, a graph illustrating cross-talk noise spectra for square and RCA input waveforms ($f_O$=1 GHz) will be discussed. In other words, FIG. 20 illustrates the cross-talk noise frequency spectrum for the interconnect circuit model discussed above for a square and RCA input waveforms. As illustrated, using RCA input pulses, the power is concentrated around the fundamental frequency component whereas the traditional approach has significant amount of power spread out over a wide bandwidth.

Referring now to FIG. 21, a graph illustrating cross-talk noise power for an RCA input pulse normalized to that of a square pulse at several frequencies offsets from the fundamental frequency component ($f_O$) will be discussed. The noise power at the fundamental frequency is 2 dB down, whereas at the 3 harmonic ($3f_O$) is as low as 18 dB below that of the square pulse response. Thus, for the example discussed herein, the results show an 18 dB improvement in cross-talk noise at 3 times the fundamental frequency ($3f_O$).

As illustrated in FIG. 22, a block diagram of an exemplary raised cosine transmitter 2200 will be discussed. As illustrated in FIG. 22, the RCA transmitter synchronizes the on-chip clock 2205 with the sinusoidal oscillator 2220, which may be distributed to the pulse select switches 2230 to convert the NRZ data into RCA pulses. The overhead of the proposed transmitter 2200 due to the sinusoidal oscillator 2220 and timing synchronization blocks may be reduced since it is shared by a large number of drivers 2240, such as in the case of a parallel on-chip data/clock bus. Differential distribution of the analog sinusoidal waveforms may improve noise immunity. Furthermore, the RCA can be added in current domain with current-mode Class B line drivers to improve efficiency and transmitter signal-return cross-talk.

It will be understood that embodiments of the present invention discussed above with respect to FIGS. 15 through 22 are provided for exemplary purposes only and that embodiments of the present invention should not be limited by this example.

The use of RCA pulses may reduce the noise cross-talk and power dissipation by using basis functions that are band-limited to within two times the fundamental frequency of the pulse. By band-limiting the bandwidth of the pulse train at the transmitter end instead of pre-emphasizing the higher frequency components, the high frequency bus interconnect noise cross-talk may be significantly reduced. This may allow wide bus interconnections to be optimized for low RC delays, i.e. large aspect ratio interconnects exemplified by the current technology trend of taller wires, which may improve signal latencies and group delays.

Figure 23:
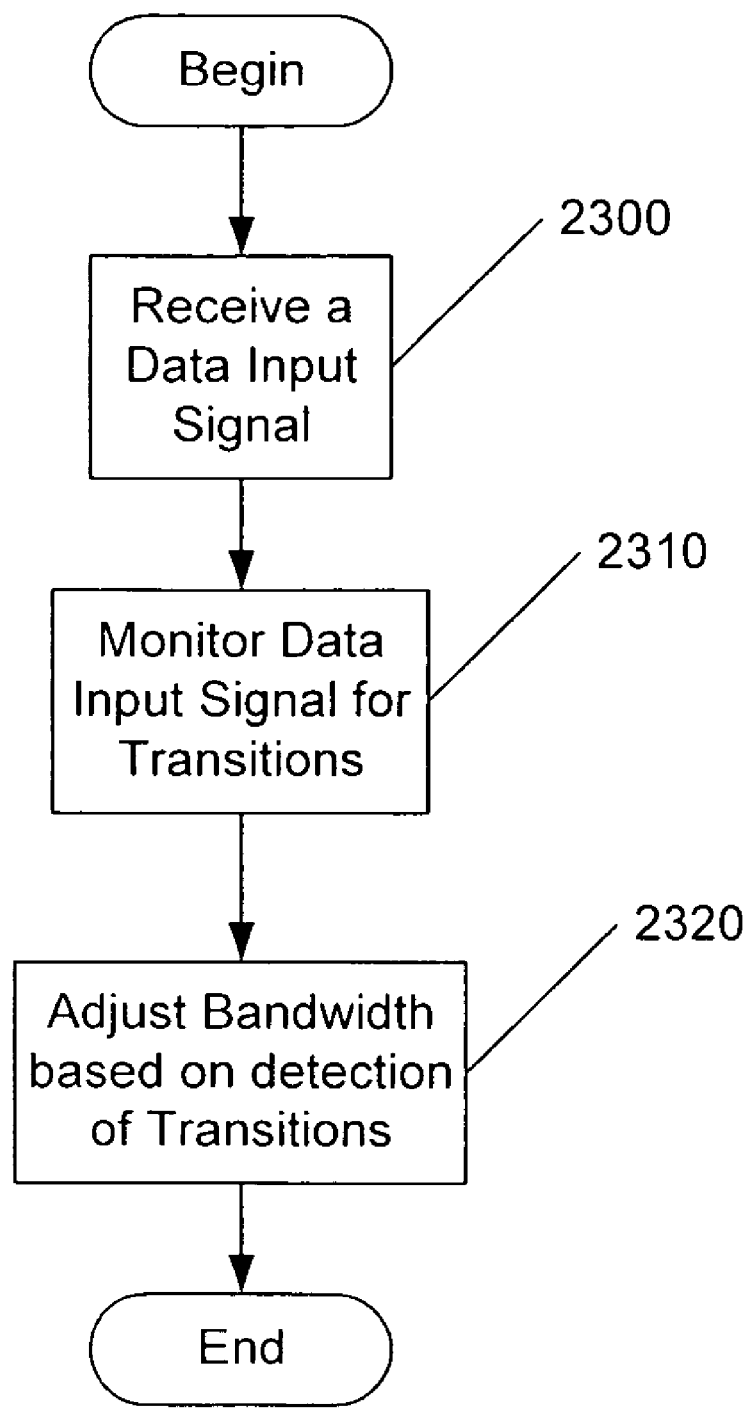
FIG. 23 is a flow chart illustrating operations of adaptive bandwidth buses according to some embodiments of the present invention.
Figure 24:
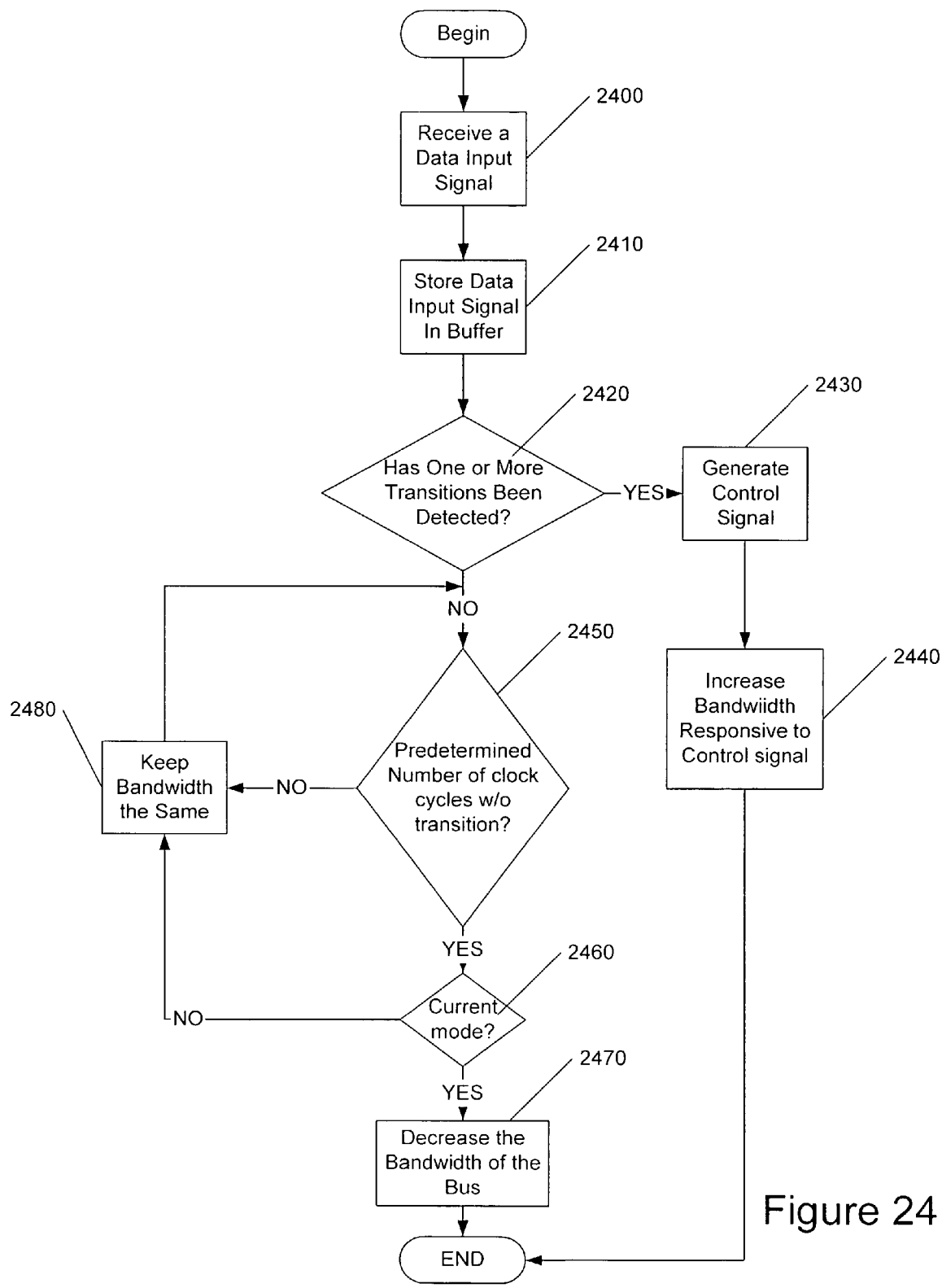
FIG. 24 is a flow chart illustrating operations of adaptive bandwidth buses according to further embodiments of the present invention.

Operations of adaptive bandwidth buses according to embodiments of the present invention will now be discussed with respect to the flowchart diagrams of FIGS. 23 and 24. Referring now to FIG. 23, operations of transmitting a signal over a bus according to embodiments of the present invention begin at block 2300 by receiving a data input signal. As discussed above, the data input signal may include a square wave or an RCA pulse without departing from the teachings of the present invention. Furthermore, the data input signal may include a plurality of bits. The number of bits included in the data input signal may vary, for example, the data input signal may include sixteen or thirty-two bits. The data input signal may be monitored to detect transitions of the plurality of bits (block 2310). A bandwidth of the adaptive bandwidth bus may be adjusted based on the detection of at least one transition of one or more of the plurality of bits of the input data signal (block 2320).

Operations of an adaptive bandwidth bus according to embodiments of the present invention will now be discussed with respect to the flowchart diagram illustrated in FIG. 24. Referring now to FIG. 24, operations of transmitting a signal over a bus according to embodiments of the present invention begin at block 2400 by receiving a data input signal. As discussed above, the data input signal may include a square wave or an RCA pulse without departing from the teachings of the present invention. Furthermore, the data input signal may include a plurality of bits. The number of bits included in the data input signal may vary as discussed above. For example, the data input signal may include sixteen or thirty-two bits. The received data input signal may be stored in a buffer (block 2410). The buffer may be, for example, a first in first out (FIFO) buffer and may have a depth of $C_p+1$, where $C_p$ is equal to a predetermined number of clock cycles. Storing the data input signal in an input buffer may allow the adaptive bandwidth bus time to switch between current mode and voltage mode as discussed further below. It is determined if a transition of one or more data input bits has been detected (block 2420). If it is determined that one or more transitions of the input data bits has been detected (block 2420), a control signal may be generated (block 2430). It will be understood that in certain embodiments of the present invention all of the data bits are monitored (block 2410) at the same time and a single control signal may be generated (block 2430) when a transition of one or more of the data bits is detected. However, it will also be understood that the data bits may be split into multiple sets of data bits, each set being individually monitored (block 2410) for a transition of one or more of the data bits in the set. Furthermore, each set may have a dedicated control signal that may be generated (block 2430) if a transition is detected in the corresponding set of data bits. The bandwidth of the adaptive bandwidth bus may be increased, i.e. the adaptive bandwidth bus may switch to current mode, responsive to the control signal (block 2440).

If on the other hand, it is determined that a transition has not been detected (block 2420), it may be determined if the predetermined number of clock cycles $C_p$ have passed without detection of a transition (block 2450). If it is determined that the predetermined number of clock cycles have not passed (block 2450), the adaptive bandwidth bus does not change the bandwidth of the adaptive bandwidth bus, i e. does not change modes of operation (block 2480). If, on the other hand, it is determined that the predetermined number of clock cycles $C_p$ have passed (block 2450), it is determined if the adaptive bandwidth bus is operating in current mode (block 2460). If the adaptive bandwidth bus is not operating in current mode, the adaptive bandwidth bus does not change the bandwidth of the adaptive bandwidth bus, i.e. does not change modes of operation (block 2480). If, on the other hand, the adaptive bandwidth bus is operating in current mode, the bandwidth of the adaptive bandwidth bus may be decreased, i.e. the adaptive bandwidth bus may switch to voltage mode (block 2470). It will be understood that the operations discussed with respect to FIG. 24 may be repeated as necessary, for example, when a new input data signal is received.

As discussed briefly above with respect to FIGS. 1 through 24, embodiments of the present invention provide adaptive bandwidth buses configured to switch between a current mode of operation and a voltage mode of operation. The adaptability of the bus may provide integrated circuits having improved power consumption and increased throughput relative to conventional devices. In certain embodiments of the present invention, the input data signal may be an RCA pulse, i.e. a first and a second frequency of a Fourier transform of a corresponding square wave. Embodiments of the present invention receiving the RCA pulse may further provide reduced cross-talk noise relative to conventional devices.

Embodiments of the present invention have been described above with reference to flowchart illustrations and/or block diagrams of methods, apparatus (systems) and-computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions/acts specified in the flowchart and/or block diagram block or blocks.

It should also be noted that in some alternate implementations, the functions/acts noted in the blocks may occur out of the order noted in the flowcharts. For example, two blocks shown in succession may in fact be executed substantially That which is claimed is:

1. An integrated circuit device, comprising:
an adaptive bandwidth bus that is configured to switch between a current mode of operation and a voltage mode of operation, wherein the adaptive bandwidth bus is further configured to switch between a current mode of operation and a voltage mode of operation responsive to transitions of bits of an input data signal.

2. The integrated circuit device of claim 1 wherein the adaptive bandwidth bus further comprises:
a transition detector that is configured to detect the transitions of bits of the input data signal; and
at least one hybrid repeater configured to operate in the current mode of operation when at least one transition of at least one bit of the input data signal is detected and operate in the voltage mode of operation when no transitions of bits of the input data signal have been detected for a predetermined number of clock cycles ($C_p$).

3. The integrated circuit device of claim 2 wherein the transition detector is further configured to generate a control signal responsive to the detection of at least one transition of at least one bit of the input data signal and wherein the at least one hybrid repeater is further configured to switch to the current mode of operation responsive to the control signal.

4. The integrated circuit device of claim 2, wherein the predetermined number of clock cycles ($C_p$) is determined based on an overall processing delay of the adaptive bandwidth bus.

5. The integrated circuit device of claim 4, wherein the overall processing delay is determined based on a transition detector delay and/or a control signal delay.

6. The integrated circuit device of claim 2 wherein the adaptive bandwidth bus further comprises an input buffer, the bits of the input data signal being stored in the input buffer so as to allow the at least one hybrid repeater time to switch from the voltage mode of operation tote current mode of operation if at least one transition of at least one bit of the input data signal is detected.

7. The integrated circuit device of claim 6 wherein the input buffer is a first in first out (FIFO) buffer and has a depth equal to $C_{p+1}$.

8. The integrated circuit device of claim 7 wherein $C_p$ is equal to 2.

9. The integrated circuit device of claim 1, further comprising a raised cosine transmitter configured to transmit a raised cosine approximation (RCA) signal, wherein the data input signal comprises the RCA signal.

10. The integrated circuit device of claim 9 wherein the RCA signal comprises less than all frequencies of a Fourier transform of a corresponding square wave.

11. An integrated circuit device, comprising:
an adaptive bandwidth bus that is configured to switch between a current mode of operation and a voltage mode of operation, wherein a bandwidth of the adaptive bandwidth bus is increased during the current mode of operation and wherein the bandwidth of the adaptive bandwidth bus is decreased during the voltage mode of operation.

12. An integrated circuit device, comprising:
a plurality of data lines that are configured to operate in either current mode or voltage mode; and
at least one control line that is configured to identify whether at least one of the plurality of data lines is operating in current mode or in voltage mode.

13. The integrated circuit device of claim 12, wherein the plurality of data lines comprise a first set of data lines and a second set of data lines and wherein the at least one control line comprises a first control line configured to identify whether at least one of the first set of data lines is operating in current mode or in voltage mode and a second control line configured to identify whether at least one of the second set of data lines is operating in current mode or in voltage mode.

14. The integrated circuit device of claim 13, further comprising a raised cosine transmitter configured to transmit a raised cosine approximation (RCA) signal, wherein a data input signal on the plurality of data lines comprises the RCA signal.

15. The integrated circuit device of claim 14 wherein the RCA signal comprises less than all frequencies of a Fourier transform of a corresponding square wave.

16. The integrated circuit device of claim 12, further comprising a transition detector that is configured to detect transitions of bits on the plurality of data lines and generate the at least one control signal and being configured to adjust a bandwidth of the plurality of data lines based on the at least one control signal.

17. The integrated circuit device of claim 16, wherein the plurality of data lines are further configured to operate in the current mode when at least one transition of at least one bit on the plurality of data lines is detected and operate in the voltage mode when no transitions of bits on the plurality of data lines have been detected for a predetermined number of clock cycles ($C_p$).

18. The integrated circuit device of claim 16 wherein the bandwidth of the data lines is increased during the current mode and wherein the bandwidth of the data lines is decreased during the voltage mode.

19. The integrated circuit device of claim 18 wherein the transition detector is further configured to generate the at least one control signal on a control line responsive to the detection of at least one transition of at least one bit on the plurality of data lines, the integrated circuit device further comprising at least one hybrid repeater that is configured to switch operations of the data lines to the current mode responsive to the at least one control signal.

20. The integrated circuit device of claim 19 wherein the integrated circuit device further comprises a first in first out (FIFO) buffer, the bits on the plurality of data lines being stored in the FIFO buffer to allow the at least one hybrid repeater time to switch from the voltage mode to the current mode if at least one transition of at least one bit on the plurality of data lines is detected.

21. The integrated circuit device of claim 20 wherein the (FIFO) buffer has a depth equal to $C_p+1$.

22. An integrated circuit device, comprising:
an adaptive bandwidth bus that is configured to switch between a current mode of operation and a voltage mode of operation responsive to transitions of a raised cosine approximation (RCA) input data signal.

23. The integrated circuit device of claim 22 wherein the RCA signal comprises less than all frequencies of a Fourier transform of a corresponding square wave.

24. A method of transmitting a signal over a bus comprising:
   receiving a data input signal including a plurality of bits;
   monitoring the data input signal so as to detect transitions of the plurality of bits; and
   adjusting bandwidth of the bus based on the detection of at least one transition of at least one of the plurality of bits of the input data signal.

25. A method of claim 24 comprising:
   determining if at least one transition of at least one of the plurality of bits has been detected;
   increasing the bandwidth of the adaptive bandwidth bus if at least one transition of at least one of the plurality of bits has been detected; and
   decreasing the bandwidth of the adaptive bandwidth bus if no transitions of the plurality of bits of the input data signal have been detected for a predetermined number of clock cycles ($C_p$).

26. The method of claim 25 wherein increasing and decreasing are preceded by:
   generating a control signal if at least one transition of at least one of the plurality of bits has been detected, wherein increasing the bandwidth further includes increasing the bandwidth responsive to the control signal.

27. The method of claim 26, wherein generating is preceded by:
   storing the data input signal in an input buffer to allow the adaptive bandwidth bus time to adjust the bandwidth of the adaptive bandwidth bus if at least one transition of at least one of the plurality of bits of the input data signal is detected.

28. The method of claim 24 wherein receiving a data input signal comprises receiving a raised cosine approximation (RCA) signal.

29. The method of claim 28 wherein receiving the RCA signal comprises receiving less than all frequencies of a Fourier transform of a corresponding square wave.

30. A method of transmitting a signal over a bus comprising switching between a current mode of operation and a voltage mode of operation responsive to transitions of bits of an input data signal.

31. The method of claim 30, comprising:
   receiving the data input signal including a plurality of bits; and
   monitoring the data input signal so as to detect of the transitions of the bits, wherein bandwidth of the bus is increased during the current mode of operation and the bandwidth of the bus is decreased during the voltage mode of operation.

32. A method of claim 31, comprising:
   determining if at least one transition of at least one of the bits of the input data signal has been detected;
   increasing the bandwidth of the bus if at least one transition of at least one of the bits of the input data signal has been detected; and
   decreasing the bandwidth of the bus if no transitions of the bits of the input data signal have been detected for a predetermined number of clock cycles ($C_p$).

33. The method of claim 32, wherein increasing and decreasing are preceded by:
   generating a control signal if at least one transition of at least one of the bits of the input data signal has been detected, wherein increasing the bandwidth further includes increasing the bandwidth responsive to the control signal.

34. The method of claim 33, wherein generating is preceded by:
   storing the data input signal in an input buffer so as to allow the bus adjust the bandwidth of the adaptive bandwidth bus if at least one transition of at least one bit of the input data signal is detected.

35. The method of claim 31, wherein receiving a data input signal comprises receiving a raised cosine approximation (RCA) signal.

36. The method of claim 35 wherein receiving the RCA signal comprises receiving less than all frequencies of a Fourier transform of a corresponding square wave.

37. A method of operating a bus, comprising:
   receiving a raised cosine approximation (RCA) signal;
   monitoring the RCA signal so as to allow detection of transitions of the RCA signal; and
   adjusting a bandwidth of the bus based on the detection of at least one transition of the RCA signal.

38. The method of claim 37 wherein receiving the RCA signal comprises receiving less than all frequencies of a Fourier transform of a corresponding square wave.

39. A method of transmitting a signal on a bus, comprising:
   transmitting a data signal in a current mode or a voltage mode; and
   transmitting a control signal to indicate whether the signal is being transmitted in the current mode or the voltage mode.

40. The method of claim 39 wherein the data signal comprises a plurality of bits and wherein transmitting the control signal comprises:
   monitoring the data signal so as to detect transitions of the plurality of bits; and
   asserting the control signal if at least one transition of at least one of the plurality of bits of the data signal is detected.

41. The method of claim 40 wherein transmitting a data signal in current mode or a voltage mode comprises:
   transmitting the data signal in the current mode if at least one transition of at least one of the plurality of bits of the data signal is detected; and
   transmitting the data signal in the voltage mode if no transitions of the plurality of bits of the input data signal have been detected for a predetermined number of clock cycles ($C_p$).

42. The method of claim 41, wherein transmitting a data signal is preceded by:
   storing the data input signal in an input buffer to allow time to switch from the voltage mode to the current mode if at least one transition of at least one of the plurality of bits of the data signal is detected.

43. A data bus comprising:
   a plurality of data lines that are configured to operate in either current mode or voltage mode; and
   at least one control line that is configured to identify whether at least one of the plurality of data lines is operating in current mode or in voltage mode.

44. The data bus of claim 43, wherein the plurality of data lines comprise a first set of data lines and a second set of data lines and wherein the at least one control line comprises a first control line configured to identify whether at least one of the first set of data lines is operating in current mode or in voltage mode and a second control line configured to identify whether ax least one of the second set of data lines is operating in current mode or in voltage mode.

45. The data bus of claim 43, wherein the plurality of data lines are further configured to operate in the current mode when at least one transition of at least one bit on the plurality of data lines is detected and operate in the voltage mode when no transitions of bits on the plurality of data lines have been detected for a predetermined number of clock cycles ($C_p$).

46. The data bus of claim 43 wherein a bandwidth of the data lines is increased during the current mode and wherein the bandwidth of the data lines is decreased during the voltage mode.

47. The data bus of claim 43 wherein a data input signal on the plurality of data lines comprises a raised cosine approximation (RCA) signal.

48. The data bus of claim 47 wherein the RCA signal comprises less than all frequencies of a Fourier transform of a corresponding square wave.

* * * * *

UNITED STATES PATENT AND TRADEMARK OFFICE
CERTIFICATE OF CORRECTION

| | | |
|---|---|---|
| PATENT NO. | : 7,110,420 B2 | Page 1 of 1 |
| APPLICATION NO. | : 10/448785 | |
| DATED | : September 19, 2006 | |
| INVENTOR(S) | : Bashirullah et al. | |

It is certified that error appears in the above-identified patent and that said Letters Patent is hereby corrected as shown below:

Column 19,
Line 47 should read -- switch from the voltage mode of operation to the current mode --

Column 22,
Line 63 should read -- identify whether at least one of the second set of data lines --

Signed and Sealed this

Twenty-third Day of January, 2007

JON W. DUDAS
*Director of the United States Patent and Trademark Office*